United States Patent
Fukui

(10) Patent No.: US 8,208,804 B2
(45) Date of Patent: Jun. 26, 2012

(54) IMAGING APPARATUS AND CONTROL METHOD THEREFOR

(75) Inventor: Takaaki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 12/854,799

(22) Filed: Aug. 11, 2010

(65) Prior Publication Data

US 2011/0044680 A1   Feb. 24, 2011

(30) Foreign Application Priority Data

Aug. 18, 2009   (JP) ................................. 2009-189332

(51) Int. Cl.
G03B 7/097 (2006.01)
G03B 15/03 (2006.01)
H04N 5/238 (2006.01)
(52) U.S. Cl. ......... 396/168; 396/164; 348/363; 348/371
(58) Field of Classification Search .................. 396/164, 396/61, 166, 155, 161, 168, 179, 180, 213, 396/215, 227, 237, 238, 245; 348/371, 362, 348/364

See application file for complete search history.

(56) References Cited

U.S. PATENT DOCUMENTS

| 6,359,651 B1 | 3/2002 | Yokonuma |
| 2004/0042774 A1 * | 3/2004 | Takeuchi ........................ 396/61 |

FOREIGN PATENT DOCUMENTS

JP   2003-43550 A   2/2003

* cited by examiner

*Primary Examiner* — Rochelle-Ann J Blackman
(74) *Attorney, Agent, or Firm* — Carter, DeLuca, Farrell & Schmidt LLP

(57) ABSTRACT

An imaging apparatus includes a light metering unit, a setting unit configured to set an exposure condition including exposure time and an aperture value at a time of flash photography based on a result of light metering by the light metering unit, and a first calculation unit configured to calculate an amount of light emission by a light emission unit to perform flash photography under the set exposure condition based on the result of light metering, wherein, when a first amount of light emission to perform flash photography under a first exposure condition is larger than a maximum amount of light emission that can be achieved by the light emission unit, the setting unit sets a second exposure condition having shorter exposure time and a smaller aperture value than the first exposure condition, and the first calculation unit calculates a second amount of light emission smaller than the maximum amount of light emission.

20 Claims, 12 Drawing Sheets

| LIGHT EMISSION TIME | EXPOSURE AMOUNT LEVEL |
|---|---|
| 10 | -2.74 |
| 15 | -0.82 |
| 20 | 0.21 |
| 35 | 1.36 |
| 60 | 2.57 |
| 100 | 3.36 |
| 160 | 4.18 |
| 250 | 4.67 |
| 500 | 5.22 |
| 1200 | 5.34 |

FIG. 6A

| APERTURE VALUE | SHUTTER SPEED | IMAGING SENSITIVITY |
|---|---|---|
| 5.6 | 1/1000SECONDS | ISO100 |

FIG. 6B

| APERTURE VALUE | SHUTTER SPEED | IMAGING SENSITIVITY | Delta_EF | LIGHT EMISSION TIME | EXPOSURE CONDITIONS | AMOUNT OF LIGHT EMISSION |
|---|---|---|---|---|---|---|
| 8 | 1/500 SECONDS | ISO100 | LEVEL 6 | 1200 μSec | ○ | × |

FIG. 6C

| APERTURE VALUE | SHUTTER SPEED | IMAGING SENSITIVITY | Delta_EF | LIGHT EMISSION TIME | EXPOSURE CONDITIONS | AMOUNT OF LIGHT EMISSION |
|---|---|---|---|---|---|---|
| 6.2 | 1/830 SECONDS | ISO100 | LEVEL 5.26 | 1000 μSec | ◯ | ◯ |

FIG. 8A

| APERTURE VALUE | SHUTTER SPEED | IMAGING SENSITIVITY | Delta_EF | LIGHT EMISSION TIME | EXPOSURE CONDITIONS | AMOUNT OF LIGHT EMISSION |
|---|---|---|---|---|---|---|
| 5.6 | 1/1000 SECONDS | ISO100 | LEVEL 6 | 1200 μSec | × | × |

FIG. 8B

| APERTURE VALUE | SHUTTER SPEED | IMAGING SENSITIVITY | Delta_EF | LIGHT EMISSION TIME | EXPOSURE CONDITIONS | AMOUNT OF LIGHT EMISSION |
|---|---|---|---|---|---|---|
| 2.8 | 1/4000 SECONDS | ISO100 | LEVEL 4 | 150 μSec | ○ | ○ |
| 4 | 1/2000 SECONDS | ISO100 | LEVEL 5 | 400 μSec | ○ | ○ |
| 5.6 | 1/1000 SECONDS | ISO100 | LEVEL 6 | 1200 μSec | × | × |

IMAGING APPARATUS AND CONTROL METHOD THEREFOR

BACKGROUND OF THE INVENTION

1. Field of the Invention

The present invention relates to an imaging apparatus, and more particularly to exposure control of the imaging apparatus at the time of flash photography.

2. Description of the Related Art

Some of conventional imaging apparatuses perform automatic exposure control so that a subject is properly exposed and, when an exposure time necessary to achieve proper exposure is longer than a predetermined exposure time, perform flash photography. Such an imaging apparatus controls the minimum exposure time at the time of flash photography so as to be equal to or longer than the longest light emission time, a time period during which flash light may possibly be emitted, so that exposure is not ended during flash light emission.

For example, Japanese Patent Application Laid-Open No. 2003-43550 discusses a camera system which changes the minimum exposure time at the time of flash photography according to the longest light emission time of an electronic flash device connected to a camera in consideration that the longest light emission time differs for each type of electronic flash device connected to the camera.

However, with conventional imaging apparatuses which set the minimum exposure time at the time of flash light emission according to the longest light emission time of the electronic flash device, there has been the following subjects. For example, with a scene having a bright background and a dark main subject such as a backlight scene in the daytime, an attempt to properly expose a main subject by emitting flash light prolongs the exposure time exceeding an exposure time for achieving proper background exposure. Therefore, there has been a problem of background overexposure.

Further, when an aperture is changed to a lower exposure amount level corresponding to the prolonged exposure time to avoid background overexposure, a distance over which the flash light reaches is reduced due to the closed aperture and accordingly a sufficient amount of flash light does not reach the main subject. Therefore, there has been another problem that a dark image is captured for the main subject.

SUMMARY OF THE INVENTION

According to an aspect of the present invention, an imaging apparatus includes a light metering unit, a setting unit configured to set an exposure condition including exposure time and an aperture value at a time of flash photography based on a result of light metering by the light metering unit, and a first calculation unit configured to calculate an amount of light emission by a light emission unit to perform flash photography under the set exposure condition based on the result of light metering, wherein, when a first amount of light emission to perform flash photography under a first exposure condition is larger than a maximum amount of light emission that can be achieved by the light emission unit, the setting unit sets a second exposure condition having shorter exposure time and a smaller aperture value than the first exposure condition, and the first calculation unit calculates a second amount of light emission smaller than the maximum amount of light emission.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A to 6C illustrate examples of settings of exposure conditions and amount of flash light emission at the time of flash photography in the first exemplary embodiment of the present invention.

FIGS. 8A and 8B illustrate examples of settings of exposure conditions and amount of flash light emission at the time of flash photography in the second exemplary embodiment of the present invention.

DESCRIPTION OF THE EMBODIMENTS

Various exemplary embodiments, features, and aspects of the invention will be described in detail below with reference to the drawings.

A first exemplary embodiment in the present invention will be described below.

Figure 1:
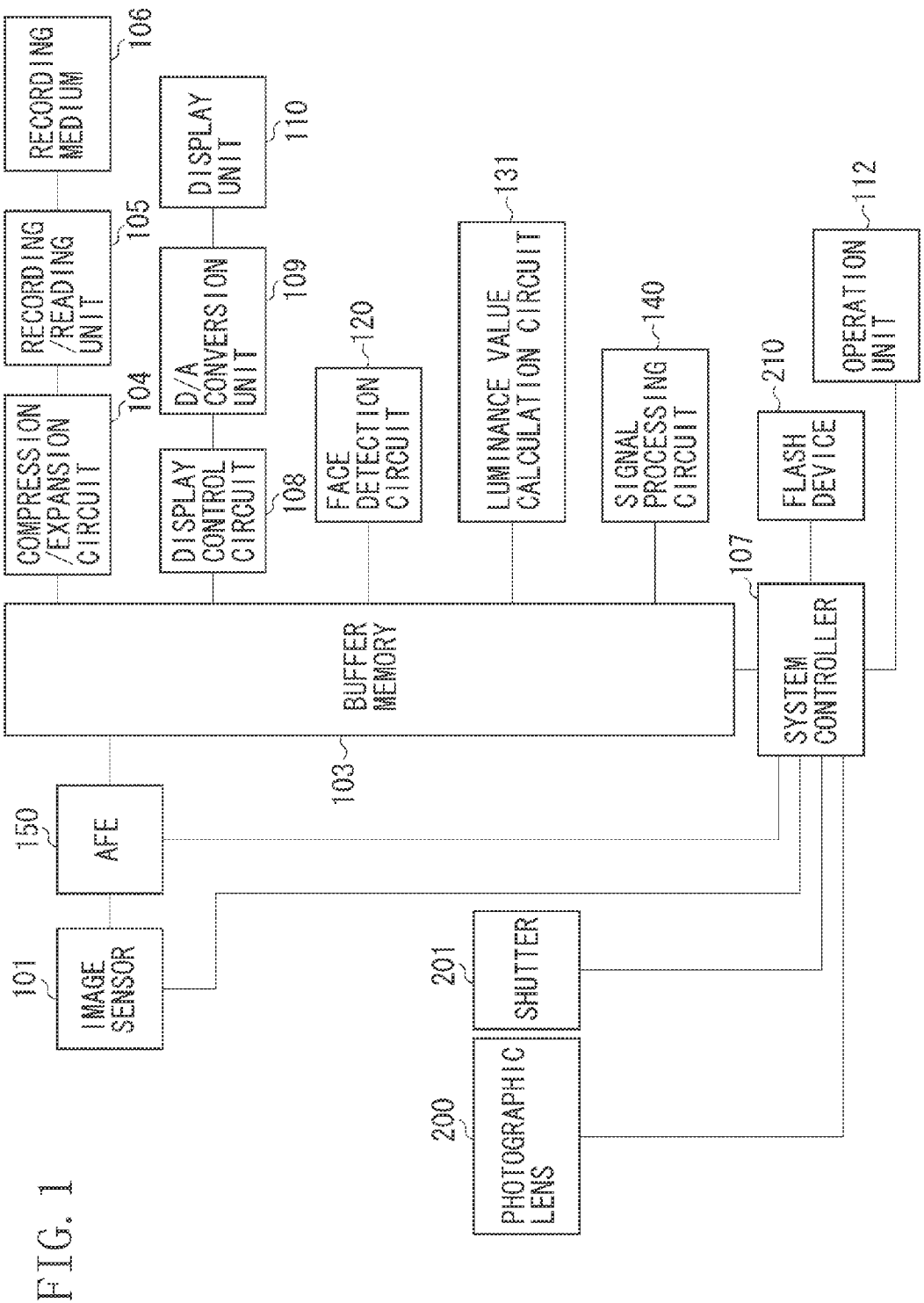
FIG. 1 is a block diagram illustrating a configuration of an imaging apparatus according to an exemplary embodiment of the present invention.

FIG. 1 is a block diagram illustrating a configuration of an imaging apparatus according to the present exemplary embodiment. When a user instructs the imaging apparatus to capture an image via an operation unit 112, a system controller 107 controls a focal position of a photographic lens 200, a shutter 201 having an aperture function, an image sensor 101, and a flash device 210 which performs flash photography, to perform imaging. Although the present exemplary embodiment will be described below based on a case where the flash device 210 is built in the imaging apparatus, the flash device 210 may be an external flash device detachably attached to the imaging apparatus.

When imaging is performed, an image signal is output from the image sensor 101 and then stored in a buffer memory 103 via an analog front end (AFE) circuit 150.

When detecting a face area, a face detection circuit 120 detects coordinates of the face area from the image signal stored in the buffer memory 103. Further, when calculating a luminance value for each of blocks which are acquired by dividing a field into a plurality of blocks, a luminance value calculation circuit 131 calculates the luminance value for each block based on the image signal stored in the buffer memory 103.

The system controller 107 performs scene analysis from the result of face detection and the luminance value for each block, and sets various signal processing parameters such as white balance correction coefficient and gradation characteristic parameters to a signal processing circuit 140. The signal processing circuit 140 performs signal processing for the image signal stored in the buffer memory 103.

When image recording is performed, the image signal in the buffer memory 103 is transferred to a compression/expansion circuit 104 to be subjected to image compression as a Joint Photographic Experts Group (JPEG) file, and then recorded in a recording medium 106 by a recording/reading unit 105. Further, a display image is generated by a display control circuit 108 based on the image signal stored in the buffer memory 103 and then displayed on a display unit 110 via a digital-to-analog (D/A) conversion unit 109.

When the face area is detected by the face detection circuit 120, the system controller 107 instructs the display control circuit 108 to display a face frame for the detected face area.

Figure 2:
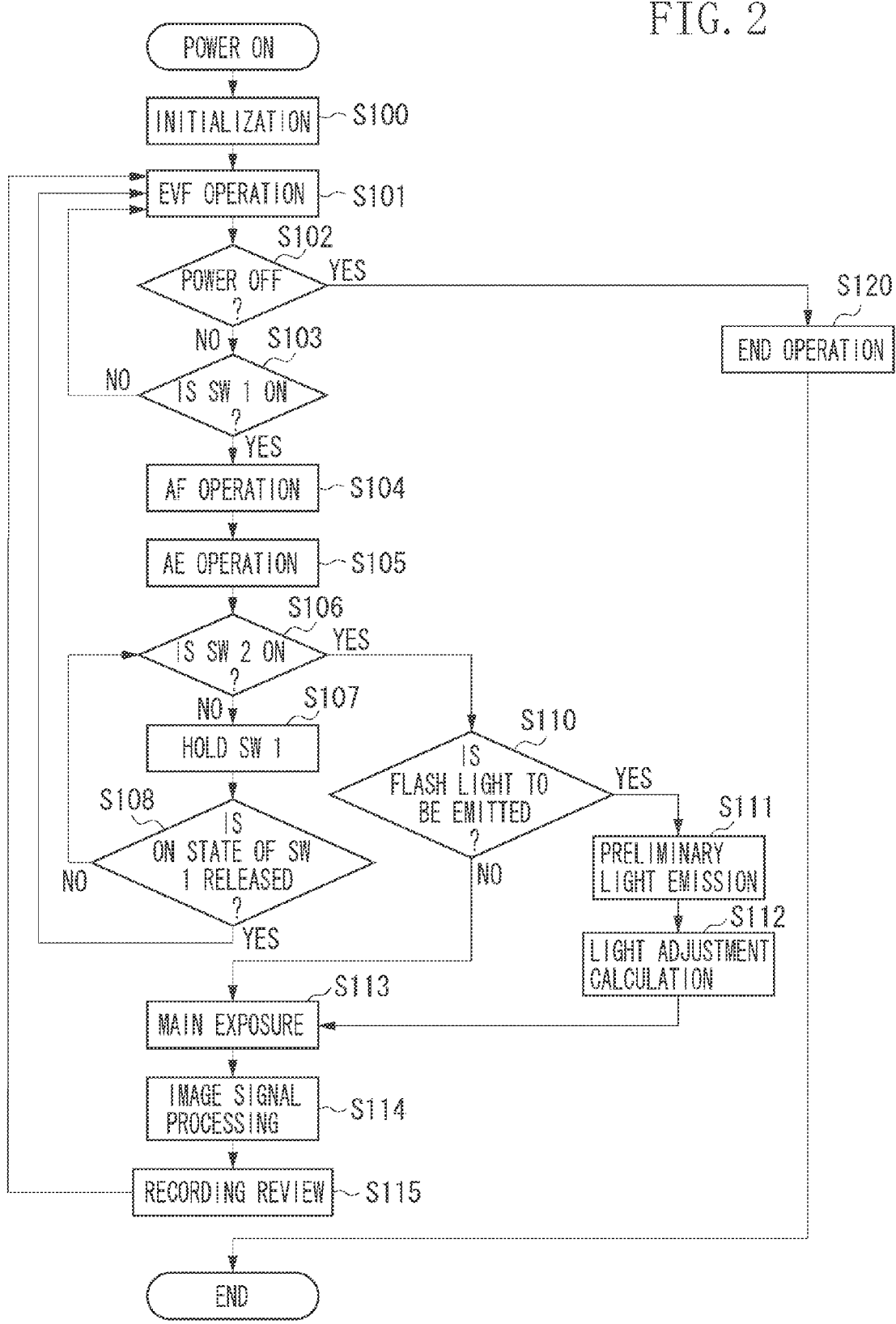
FIG. 2 is a flow chart illustrating a sequence of overall imaging operations of the imaging apparatus according to the exemplary embodiment of the present invention.

FIG. 2 is a flow chart illustrating a sequence of overall imaging operations of the imaging apparatus according to the present exemplary embodiment.

After turning on the power of the imaging apparatus, in step S100, the system controller 107 performs initialization operation such as a forward movement of the photographic lens 200. In step S101, the system controller 107 shifts to an electric view finder (EVF) operation in which images captured by the image sensor 101 are sequentially displayed on the display unit 110. During the EVF operation, an automatic exposure control (Auto Exposure: AE) operation and an automatic focusing control (Auto Focus: AF) operation are also periodically performed. Further, scene determination and face area detection (hereinafter referred to as face detection) will also be performed during the EVF operation.

In step S102, when the system controller 107 determines that the power is turned off during the EVF operation (YES in step S102), the processing proceeds to step S120. In step S120, the system controller 107 performs end operation such as retraction of the photographic lens 200.

In step S103, when the system controller 107 determines that a release button included in the operation unit 112 is half-pressed to turn ON a SW 1 during the EVF operation (YES in step S103), the processing proceeds to step S104. In step S104, the system controller 107 performs the AF operation. Then in step S105, the system controller 107 performs the AE operation to obtain a subject's luminance value (Bright Value: Bv).

Based on the detection results such as the By value and amount of movement of the subject, the system controller 107 determines exposure conditions including an imaging sensitivity (Sensitive Value: Sv), an aperture value (Aperture Value: Av), and a shutter speed (Time Value: Tv). In this case, exposure conditions are determined according to a predetermined program diagram. When the imaging apparatus is set for performing automatic flash light emission, the system controller 107 determines to perform flashlight emission when the shutter speed determined according to the program diagram is lower than a predetermined value, i.e., when the exposure time is longer than a predetermined value. Further, when a backlight scene is determined by scene determination, the system controller 107 determines to perform flash light emission.

After completion of the AE operation, the system controller 107 repeats determination in step S108 whether the ON state of the SW 1 is released until it determines in step S106 that the release button is fully pressed to turn ON a SW 2. While the ON state of the SW 1 is maintained, the imaging sensitivity, aperture value, shutter speed, and flash light emission state determined in step S105 are displayed on the display unit 110. When the system controller 107 determines that the ON state of the SW 1 is released in step S108 (YES in step S108), the processing returns to step S101.

When the system controller 107 determines that the SW 2 is turned ON in step S106 and when flash light emission is determined to be performed in step S110 (YES in steps S106 and S110), in step S111, the system controller 107 performs preliminary light emission. Then in step S112, the system controller 107 performs light adjustment calculation based on a result of light metering at the time of preliminary light emission. In step S113, the system controller 107 performs main exposure. In step S114, an image signal acquired by main exposure is subjected to signal processing and recorded to a recording medium. In step S115, the system controller 107 performs recording review for displaying the captured image on the display unit 110 for a predetermined time period to check the captured image, and then the processing returns to step S101.

Figure 3:
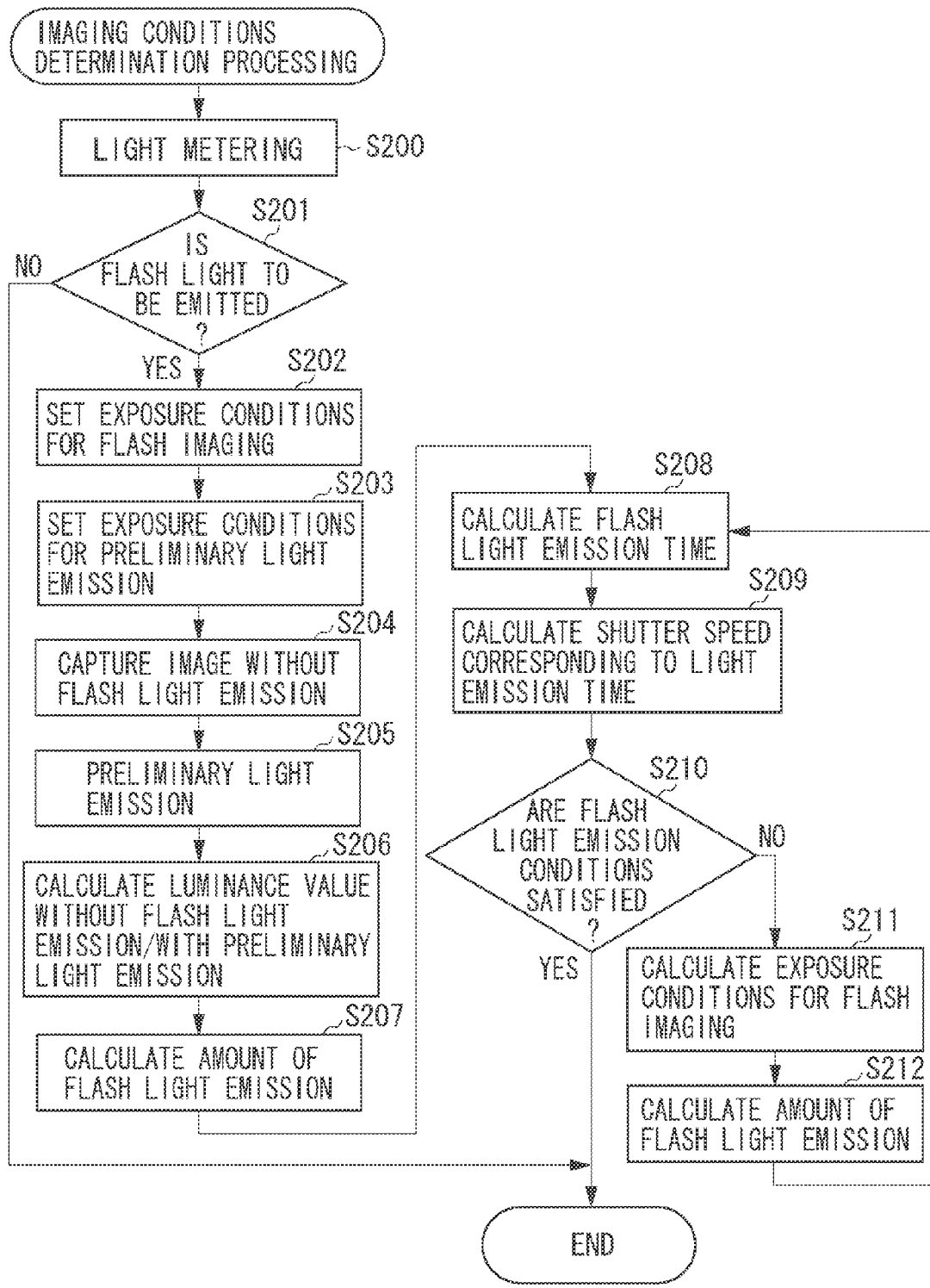
FIG. 3 is a flow chart illustrating processing for determining flash photography conditions in a first exemplary embodiment of the present invention.

Processing for determining imaging conditions at the time of flash photography in the present exemplary embodiment will be described in detail below with reference to FIG. 3. FIG. 3 is a flow chart illustrating processing for determining the imaging conditions at the time of flash photography, and corresponds to processing of steps S104 to S112 of the flowchart illustrated in FIG. 2.

In step S200, the system controller 107 determines the Tv (AE_Tv) value through the AE operation. More specifically, the system controller 107 performs imaging based on predetermined imaging conditions during the EVF operation, stores the acquired image signal in the buffer memory 103, divides the image signal into a plurality of blocks, and calculate an average luminance value for each division block.

Then, the system controller 107 calculates a screen average (Y_Ave) value after assigning a predetermined weight to each division block. In this case, the system controller 107 may perform center-weighted light metering through weighting at screen center to calculate a screen average value, perform subject-based evaluative light metering by selectively assigning a weight to the subject area according to the result of face detection, or perform average light metering to simply calculate a screen average value.

The system controller 107 converts a difference between the screen average value and an AE control target value (AE_Target) to an exposure amount level (Delta_AE), and determines the Bv value by using formula 1.

$$Bv=Av+Tv-Sv+Delta\_AE \quad \text{Formula 1}$$

where Delta_AE=Log(Y_Ave/AE_Target)/Log(2).

Figure 4:
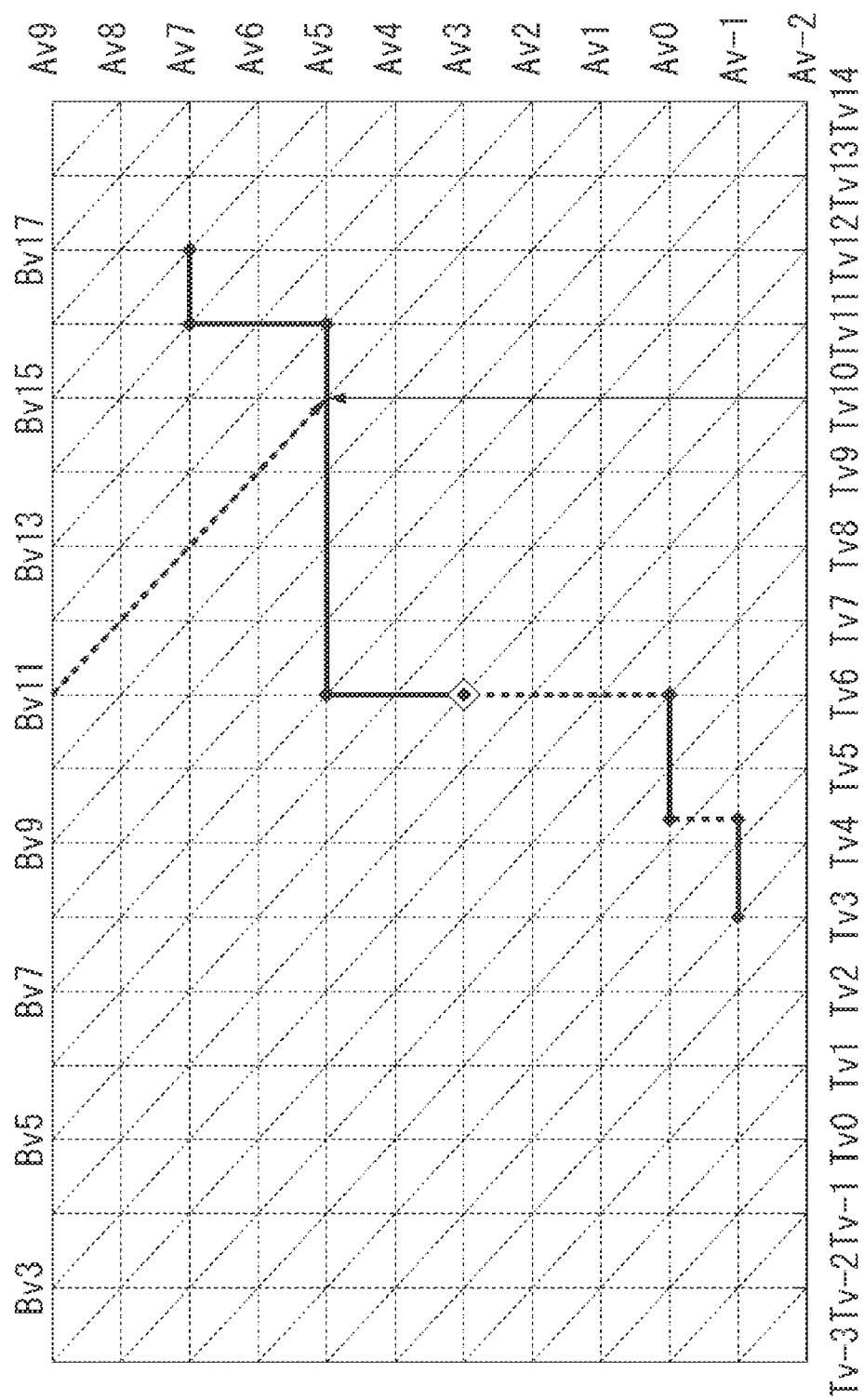
FIG. 4 illustrates an exemplary program diagram of the imaging apparatus according to the exemplary embodiment of the present invention.

Then, based on the determined By value, the system controller 107 determines exposure conditions including the aperture value, the shutter speed, the imaging sensitivity, and so on according to the program diagram. FIG. 4 is a program diagram used in the present exemplary embodiment. The dotted lines denote variation in the imaging sensitivity and the solid lines denote variation in the shutter speed and the aperture value. More specifically, Av=3 denotes a state where the aperture opens most and therefore, when the aperture needs to be opened more, the imaging sensitivity is to be changed.

In step S201, the system controller 107 determines whether the flash light is to be emitted based on the result of shutter speed and backlight determination made in step S200. For example, the system controller 107 may determine that the flash light is emitted when the shutter speed is lower than a predetermined speed, or that the flash light is emitted when a backlight scene is determined, for example, the background is bright and the face area of the main subject is dark, as the result of screen analysis.

Figure 9:
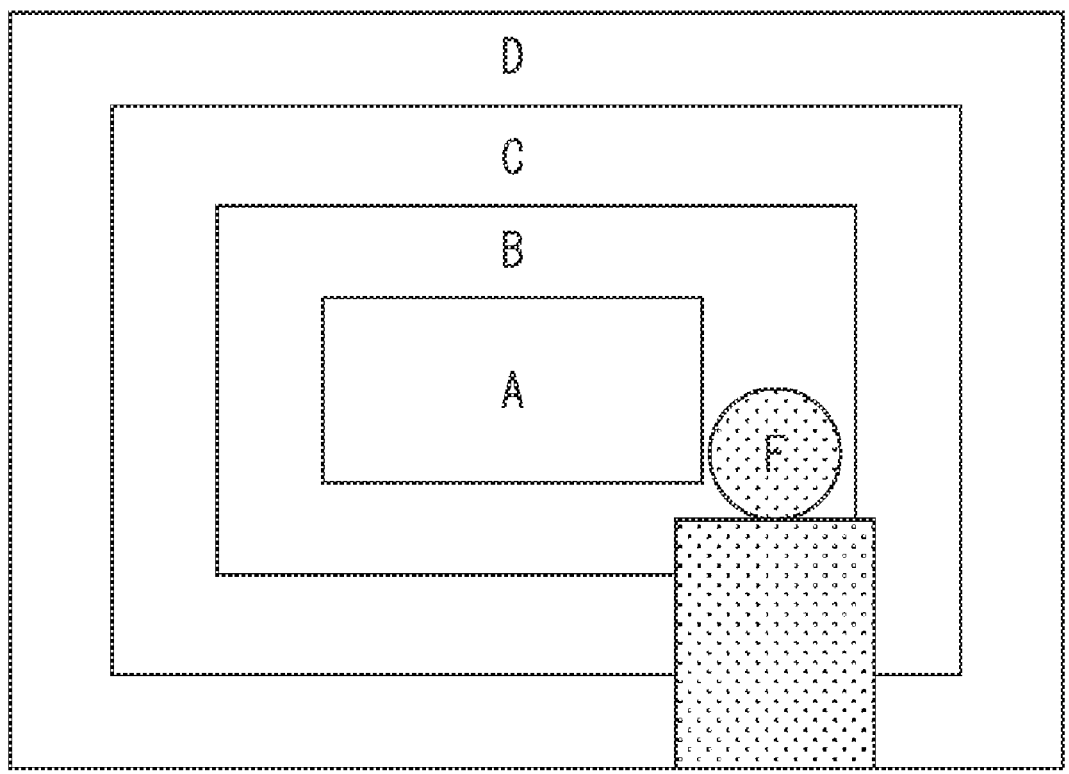
FIG. 9 illustrates an example of a method of backlight determination according to the exemplary embodiment of the present invention.

An example of a method for determining backlight will be described below with reference to FIG. 9. Referring to FIG. 9, the field is divided into four areas A to D, and an average luminance value is calculated for each division area. Further, the average luminance value is calculated even for a face area F of a main subject detected through face detection. Then, the system controller 107 compares the luminance value of the face area F with the luminance value of each of the division areas A to D. When the luminance value of any one of the division areas A to D is higher than the luminance value of the face area F by at least a predetermined value, it determines a backlight scene. A backlight scene may be determined based on a luminance value histogram of the field which is acquired therefrom or by performing any other known backlight determination method.

When the flash light is emitted, processing for determining the imaging conditions is completed. When the flash light is emitted, the system controller 107 determines exposure conditions for flash photography in step S202. When the shutter speed determined in step S200 is lower than the predetermined speed, the shutter speed for flash photography is replaced with the predetermined speed, and other exposure conditions are also determined again according to the program diagram.

When the shutter speed determined in step S200 is higher than the predetermined speed, the exposure conditions determined in step S200 are used as the exposure conditions for flash photography. In this case, it is not necessary to separately determine exposure conditions in step S202. Further, it is also possible to preset one of the exposure conditions as the exposure condition for flash photography, and determine the remaining exposure conditions based on the result of light metering in step S200.

In step S203, the system controller 107 determines exposure conditions for preliminary light emission based on the exposure conditions for flash photography determined in step S200 or S202. When an ordinary charge coupled device (CCD) is used as an image sensor, addition of pixels and a large thinning ratio may be used to drive the image sensor at high reading speeds to read an image signal for preliminary light emission. Therefore, since there is a case where the traceable imaging sensitivity differs between main exposure and preliminary light emission, it is necessary to change the exposure conditions by variation in imaging sensitivity.

Further, an amount of light emission at the time of preliminary light emission may be an amount of light emission predetermined for each Bv value, or an amount of preliminary light emission according to a distance between the subject and the camera presumed from a size of the face area obtained by face detection and the result of the AF operation. Of course, it goes without saying that preliminary light emission time must be determined within a range of exposure time at the time of preliminary light emission.

In step S204, the system controller 107 captures an image without flash light emission based on the exposure conditions determined in step S203, and acquires an image signal. In step S205, the system controller 107 actually performs preliminary light emission based on the exposure conditions determined in step S203, and acquires an image signal.

In step S206, the luminance value calculation circuit 131 calculates the luminance value for each block with respect to each of the image signal acquired without flash light emission in step S204 and the image signal acquired with preliminary light emission in step S205.

In step S207, the system controller 107 calculates a difference between the luminance value without flash light emission and the luminance value with flash light emission for each block, and calculates the luminance value (Pre_Y) after weighted addition averaging by assigning a weight to each block in a screen according to the light metering method.

Similarly, the system controller 107 calculates the luminance value (Noflash_Y) after weighted addition averaging of the luminance without flash light emission for each block. The system controller 107 calculates the amount of main flash light emission by assigning each of these luminance values after weighted addition averaging to formula 2.

$$AE\_Target = \alpha * Pre\_Y * C\_PreFlash + Noflash\_Y * C\_Noflash \quad \text{Formula 2}$$

where C_PreFlash denotes a correction value for correcting differences in the aperture value and the imaging sensitivity between main light emission and preliminary light emission, and C_Noflash denotes a correction value for correcting differences in the aperture value, the imaging sensitivity, and the shutter speed between main light emission and image capturing without light emission. To associate α satisfying formula 2 with the exposure amount level for the Tv and Av values, the system controller 107 converts α to an exposure amount level which is represented by Delta_EF.

Figures 5A, 5B:
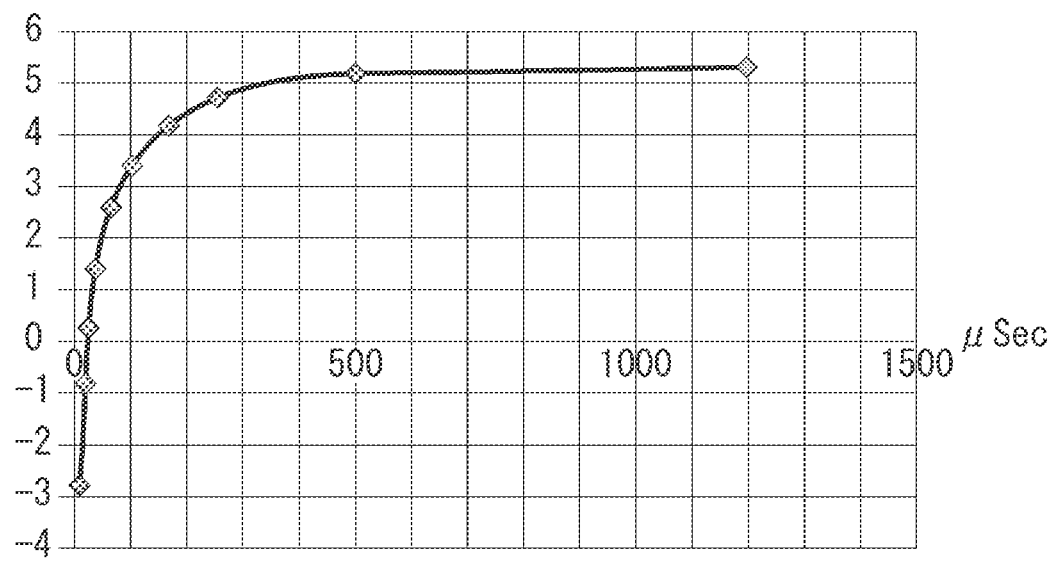
FIGS. 5A and 5B illustrate a relation between an amount of light emission and light emission time of a flash device according to the exemplary embodiment of the present invention.

FIGS. 5A and 5B illustrate a relation between the flash light emission time and the value of Delta_EF. Referring to a graph illustrated in FIG. 5A, a vertical axis is assigned the value of Delta_EF corresponding to the amount of light emission at the time of preliminary light emission, and a horizontal axis is assigned the flash light emission time (in microseconds). The table in FIG. 5B illustrates a relation between the light emission time and the value of Delta_EF at positions illustrated by points in the graph in FIG. 5A. The value of Delta_EF is represented by the exposure amount level with reference to the amount of light emission at the time of preliminary light emission. Therefore, with the same amount of light emission as that at the time of preliminary light emission, the exposure amount level becomes zero. With a light emission time of 10 microseconds over which the amount of light emission is smaller than that at the time of preliminary light emission, the exposure amount level becomes negative.

In step S208, the system controller 107 acquires the flash light emission time corresponding to the amount of flash light emission based on the calculated value of Delta_EF. The flash light emission time may be acquired with reference to the table as illustrated in FIG. 5B, or calculated each time by using a formula for converting the amount of light emission to the light emission time. With a flash device using a xenon tube, since residual light emission occurs even after an instruction for stopping light emission because of light emission characteristics of the xenon tube, the residual light emission time may be included in the flash light emission time.

In step S209, the system controller 107 calculates the fastest shutter speed (Flash_Tv) that can be adjusted to the flash light emission time acquired in step S208. In this case, the system controller 107 may calculate the shutter speed in consideration of individual variation in time duration from the time of an instruction for starting light emission until the time of actual start of light emission.

In step S210, the system controller 107 determines whether the amount of flash light emission at the time of main light emission and the exposure conditions for flash photography determined in the above described steps satisfy the flash light emission conditions.

There are two different flash light emission conditions. One condition is that the amount of flash light emission at the time of main light emission is the amount of light emission that can be achieved by the flash device 210, i.e., the amount of flash light emission at the time of main light emission is equal to or smaller than the maximum amount of light emission of the flash device 210.

The other condition is that the shutter speed for flash photography is equal to or slower than the shutter speed calculated in step S209, i.e., the exposure time at the time of flash photography is equal to or longer than the light emission time corresponding to the amount of flash light emission.

When the amount of flash light emission at the time of main light emission determined in step S207 is larger than the amount of light emission that can be achieved by the flash device 210, a sufficient amount of light emission cannot be obtained even with flash lighting emission resulting in a dark image of the subject. Therefore, the system controller 107 determines that the above described flash light emission conditions are not satisfied. Further, when the shutter speed for flash photography determined in step S202 is faster than the shutter speed calculated in step S209, exposure is ended during flash light emission resulting in a dark image of the subject. Therefore, the system controller 107 determines that the above described flash light emission conditions are not satisfied.

When both of the above described two flash light emission conditions are satisfied, the system controller 107 determines that the flash light emission conditions are satisfied (YES in step S210), and ends the processing for determining imaging conditions at the time of flash photography.

When at least one of the above described two conditions is not satisfied, the system controller 107 determines that the flash light emission conditions are not satisfied (NO in step S210). Then in step S211, the system controller 107 newly calculates exposure conditions for flash photography. Opening more the aperture by one level is equivalent to increasing the amount of light emission by one level. Therefore, when the determined amount of flash light emission at the time of main light emission is larger than the amount of light emission that can be achieved by the flash device 210, the system controller 107 changes the aperture value to open more the aperture. Further, as the aperture value is changed to open more the aperture, the system controller 107 changes the shutter speed to increase the shutter speed to satisfy formula 1. Further, the system controller 107 changes the shutter speed so as not to exceed the shutter speed calculated in step S209, i.e., so that the exposure time may not be shortened.

As described above, in step S211, the system controller 107 newly calculates the aperture value and the shutter speed so that the relation between the aperture value and the shutter speed satisfies formula 1 and the shutter speed does not exceed the shutter speed calculated in step S209. Although the present exemplary embodiment will be described below based on a case where only the aperture value and the shutter speed are newly calculated for simplicity, three exposure conditions including the imaging sensitivity may be newly calculated.

In step S212, the system controller 107 newly calculates the amount of flash light emission based on the newly calculated exposure conditions for flash photography. Further, since the newly calculated aperture value has been changed so as to open more the aperture, the newly calculated amount of flash light emission will not exceed the amount of flash light emission calculated in step S207.

In other words, the shutter speed corresponding to the amount of flash light emission newly calculated in step S212 will not fall below the shutter speed calculated in step S209. Therefore, the shutter speed newly calculated in step S211 will not exceed the shutter speed corresponding to the amount of flash light emission newly calculated in step S212.

When the amount of flash light emission is newly calculated in step S212, the processing returns to step S208. Then, the system controller 107 determines whether the flash light emission conditions are satisfied based on the newly calculated amount of flash light emission at the time of main light emission and the exposure conditions for flash photography.

Examples of settings of the exposure conditions and the amount of flash light emission at the time of flash photography will be described below with reference to FIGS. 6A to 6C. Referring to FIGS. 6A to 6C, the imaging sensitivity will be maintained unchanged (ISO100) for simplicity.

When a result of light metering is Bv=11, after the system controller 107 determines exposure conditions according to the program diagram in step S200, Av=5 and Tv=10 are obtained as illustrated in FIG. 4. When these values are converted to the aperture value and the shutter speed, the aperture value is 5.6 and the shutter speed is 1/1000 seconds as illustrated in FIG. 6A.

Then, when the system controller 107 determines a backlight scene and flash light emission (YES in step S201), in step S202, the system controller 107 determines exposure conditions for flash photography. In this case, the shutter speed for flash photography is predetermined to 1/500 seconds. In this case, the predetermined shutter speed for flash photography is equal to or longer than the longest light emission time of the flash device 210.

Other exposure conditions are also determined according to the program diagram, for example, the aperture value is 8. Based on the thus-determined exposure conditions for flash photography (exposure conditions used for calculation of the amount of light emission at the time of flash photography), the amount of light emission is calculated in step S207 and Delta_EF=6 (exposure amount level) is obtained as a result of calculation.

In step S208, the amount of flash light emission calculated in step S207 is converted to a flash light emission time. However, since the amount of flash light emission calculated in step S207 exceeds the maximum amount of light emission of the flash device 210, it cannot be converted to the flash light emission time. In such a case, the longest light emission time of the flash device 210 is recognized as the flash light emission time, and the flash light emission time becomes 1200 microseconds. The exposure conditions and the amount of light emission (first amount of light emission) in this case are summarized as illustrated in FIG. 6B.

In step S210, the system controller 107 determines whether the flash light emission conditions are satisfied. Since the amount of flash light emission calculated in step S207 is not the amount of light emission that can be achieved by the flash device 210, the system controller 107 determines that the flash light emission conditions are not satisfied.

In step S211, therefore, the system controller 107 newly calculates exposure conditions based on the above described conditions. As a result, the aperture value becomes 6.2 and the shutter speed becomes 1/830 seconds. When comparing the light emission time obtained in step S208 with the newly calculated shutter speed, the newly calculated shutter speed is 1/830 seconds which nearly equals 1205 microseconds. This means that the shutter speed is equal to or longer than the light emission time obtained in step S208.

Further, the newly calculated shutter speed is equal to or shorter than the longest light emission time of the flash device 210. In step S212, the system controller 107 calculates the amount of flash light emission based on the exposure conditions newly calculated in step S211, and obtains Delta_EF=5.26 (exposure amount level). The exposure conditions and the amount of light emission (second amount of light emission) in this case are summarized as illustrated in FIG. 6C.

Returning to step S208, the system controller 107 converts the amount of flash light emission to the flash light emission time. In step S210, the system controller 107 determines whether the flash light emission conditions are satisfied. As a result of determination, the system controller 107 determines that both the amount of flash light emission and the exposure conditions for flash photography satisfy the flash light emission conditions.

When the exposure conditions and the amount of flash light emission at the time of flash photography are determined in this way, an image of the main subject can be captured with appropriate exposure without background overexposure, even with a backlight scene in the daytime having a bright background and a dark main subject.

Unlike the first exemplary embodiment, a second exemplary embodiment calculates a plurality of combinations of the exposure conditions and the amount of flash light emission for flash photography, and selects an optimal combination from these combinations. Since the second exemplary embodiment differs from the first exemplary embodiment only in processing for determining the imaging conditions at the time of flash photography, other descriptions will be omitted.

Figure 7:
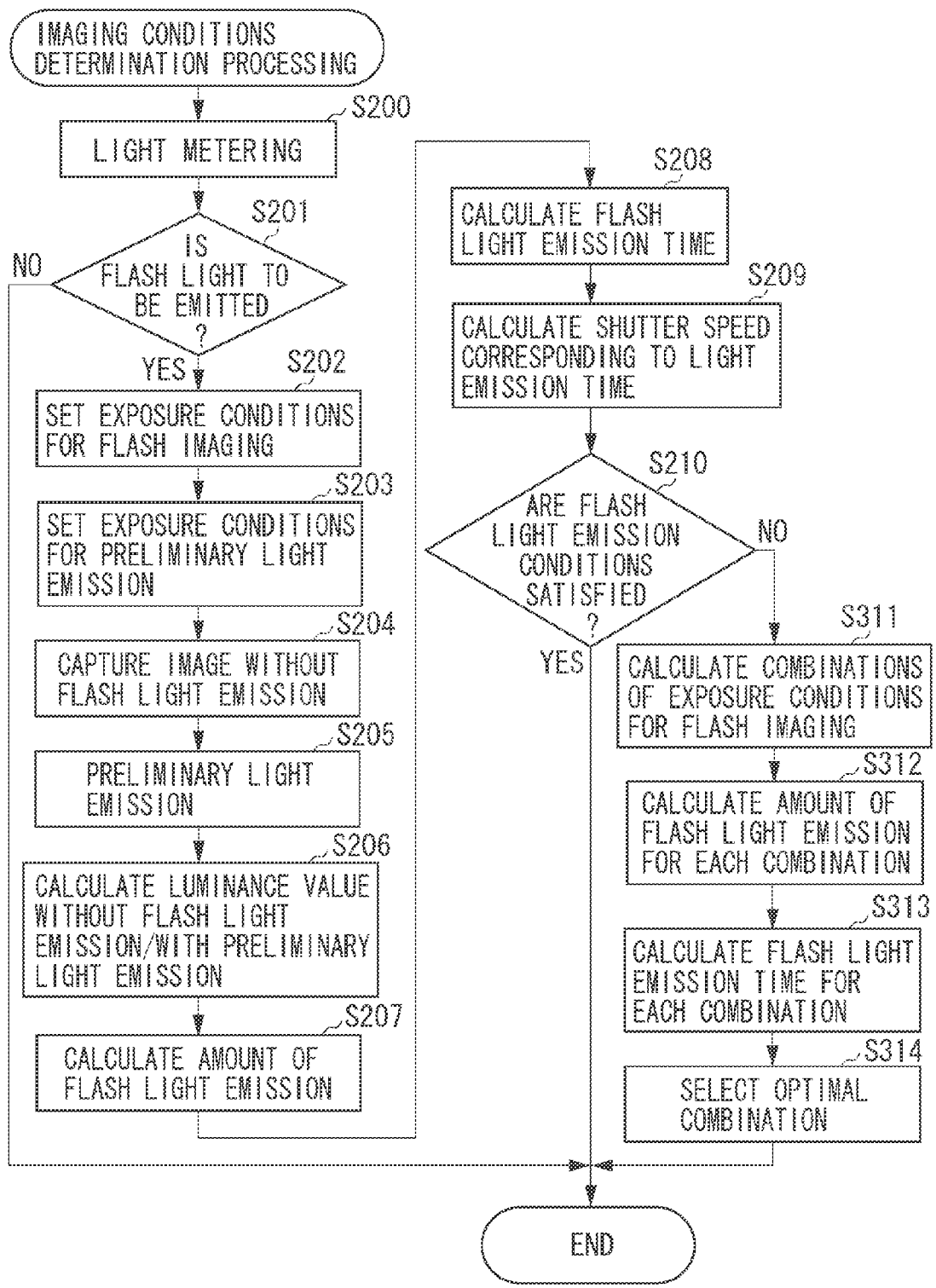
FIG. 7 is a flow chart illustrating processing for determining flash photography conditions in a second exemplary embodiment of the present invention.

FIG. 7 is a flow chart illustrating processing for determining the imaging conditions at the time of flash photography according to the present exemplary embodiment. Steps performing similar processing to FIG. 3 are assigned the same reference numeral and therefore detailed description will be omitted.

In step S201, when the system controller 107 determines that the flash light emission conditions are not satisfied (NO in step S210), the processing proceeds to step S311. In step S311, the system controller 107 calculates a plurality of combinations of the exposure conditions for flash photography.

When the amount of flash light emission at the time of main light emission determined in step S207 is larger than the amount of light emission that can be achieved by the flash device 210, the system controller 107 changes the aperture value to open more the aperture so as to reduce the amount of flash light emission, and calculates combinations of the exposure conditions for flash photography. Similarly, when the shutter speed for flash photography determined in step S200 or S202 is higher than the shutter speed calculated in step S209, the system controller 107 changes the aperture value to open more the aperture, and calculates combinations of the exposure conditions for flash photography.

Although it is necessary to decrease the shutter speed for flash photography or to increase the shutter speed corresponding to the flash light emission time, the aperture value is not changed so as to close the aperture in either case. In this stage, however, if combinations are calculated regardless of whether the flash light emission conditions are satisfied, combinations may be calculated after changing the aperture value to close the aperture.

In step S312, the system controller 107 calculates the amount of flash light emission for each combination calculated in step S311. In step S313, the system controller 107 converts each amount of flash light emission to the flash light emission time.

In step S314, the system controller 107 selects a proper combination from the calculated plurality of combinations of the exposure conditions and the amount of flash light emission for flash photography.

Examples of settings of the exposure conditions and the amount of flash light emission at the time of flash photography will be described below with reference to FIGS. 8A and 8B.

When the result of light metering is Bv=11, after the system controller 107 determines the exposure conditions according to the program diagram in step S200, Av=5 and Tv=10 are obtained as illustrated in FIG. 4. When these values are converted to the aperture value and shutter speed, the aperture value is 5.6 and the shutter speed is 1/1000 seconds as illustrated in FIG. 8A.

Then, when the system controller 107 determines a backlight scene and flash light emission (YES in step S201), in step S202, the system controller 107 determines exposure conditions for flash photography. In this case, the exposure conditions determined in step S200 are used as the exposure conditions for flash photography. Based on the exposure conditions for flash photography, the amount of flash light emission is calculated in step S207, and Delta_EF=6 (exposure amount level) is obtained as a result of calculation.

In step S208, the amount of flash light emission calculated in step S207 is converted to a flash light emission time. However, since the amount of flash light emission calculated in step S207 exceeds the maximum amount of light emission of the flash device 210, it cannot be converted to the flash light emission time. In such a case, the longest light emission time of the flash device 210 is recognized as the flash light emission time, and the flash light emission time becomes 1200 microseconds.

In step S210, the system controller 107 determines whether the flash light emission conditions are satisfied. Since the amount of flash light emission calculated in step S207 is not the amount of light emission that can be achieved by the flash device 210, the system controller 107 determines that the flash light emission conditions are not satisfied.

In step S311, the system controller 107 calculates a plurality of combinations of the exposure conditions for flash photography. In step S312, the system controller 107 acquires the amount of flash light emission and the flash light emission time for each combination. Combinations of the exposure conditions and the amount of light emission are summarized as illustrated in FIG. 8B. From FIG. 8B, it can be understood that there are two combinations that satisfy the flash light emission conditions.

In step S314, the system controller 107 selects an optimal combination from the calculated combinations. The battery power consumption by flash light emission can be minimized by selecting a combination having an aperture value of 2.8 in FIG. 8B. In other words, by selecting a combination of the exposure conditions having the minimum aperture value, the aperture is opened more at the time of flash photography, reducing necessary amount of light emission. As a result, the battery power consumption by flash light emission can be minimized.

Alternatively, when the depth of field is not to be decreased as much as possible, selecting a combination having an aperture value of 4 allows the user to capture a more desirable image. As described above, when there is a plurality of combinations satisfying flash light emission conditions, a more optimal combination may be selected according to a scene to be captured or an imaging mode. When the battery has a small residual quantity, a combination requiring less battery power consumption may be selected.

When the exposure conditions and the amount of flash light emission at the time of flash photography are determined in this way, an image of the main subject can be captured with appropriate exposure without background overexposure, even with a backlight scene in the daytime having a bright background and a dark main subject. Further, calculating a plurality of combinations enables selection of a more optimal combination according to a scene to be captured, which allows the user to capture a more desirable image.

Although the above described two exemplary embodiments perform light metering based on an image signal output from an image sensor, it is also possible to provide a light metering sensor separately from the image sensor and perform light metering based on the output of the light metering sensor.

Further, when there is no combination of the exposure conditions and the amount of flash light emission satisfying the flash light emission conditions in the above described two exemplary embodiments, which combination is used at the time of flash photography may be determined according to a scene to be captured and user settings. For example, when the main subject is given priority, it is only necessary to select a combination with which the main subject is properly exposed even if the exposure time is prolonged to such an extent that causes background overexposure. On the contrary, when the background is given priority, it is only necessary to select a combination with which the background is properly exposed even if the image of the main subject becomes dark because of insufficient amount of light emission.

The present invention is also attained by performing processing that includes supplying software (program) for achieving the above described functions of the exemplary embodiments to a system or an apparatus via a network or various types of memory media, and causing a computer (CPU or MPU) of the system or the apparatus to load and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-189332 filed Aug. 18, 2009, which is hereby incorporated by reference herein in its entirety.

What is claimed is:

1. An imaging apparatus comprising:
    a light metering unit;
    a setting unit configured to set an exposure condition including exposure time and an aperture value at a time of flash photography based on a result of light metering by the light metering unit; and
    a first calculation unit configured to calculate an amount of flash light emission by a light emission unit to perform flash photography under the set exposure condition based on the result of light metering,
    wherein, when a first amount of flash light emission to perform flash photography under a first exposure condition is larger than a maximum amount of flash light emission that can be achieved by the light emission unit, the setting unit sets a second exposure condition having shorter exposure time and a smaller aperture value than the first exposure condition, and the first calculation unit calculates a second amount of flash light emission smaller than the maximum amount of flash light emission.

2. The imaging apparatus according to claim 1, wherein the second amount of flash light emission is an amount of flash light emission to perform flash photography under the second exposure condition.

3. The imaging apparatus according to claim 1, wherein, when the first amount of flash light emission to perform flash photography under the first exposure condition is larger than the maximum amount, flash photography is performed using the second exposure condition and the second amount of flash light emission.

4. The imaging apparatus according to claim 1, further comprising:
    a second calculation unit configured to calculate a plurality of exposure conditions based on the result of light metering; and
    a selection unit configured to select one exposure condition from the calculated plurality of exposure conditions,
    wherein the setting unit sets the selected exposure condition as the second exposure condition.

5. The imaging apparatus according to claim 4, wherein the selection unit selects one exposure condition from the plurality of exposure conditions according to a scene to be captured or an imaging mode.

6. The imaging apparatus according to claim 4, wherein the selection unit selects an exposure condition having a smallest aperture value from the plurality of exposure conditions.

7. An imaging apparatus comprising:
    a light metering unit;
    a setting unit configured to set an exposure condition including exposure time and an aperture value at a time of flash photography based on a result of light metering by the light metering unit; and
    a first calculation unit configured to calculate an amount of flash light emission by a light emission unit to perform flash photography under the set exposure condition based on the result of light metering,
    wherein, when light emission time corresponding to a first amount of flash light emission to perform flash photography under a first exposure condition is longer than the exposure time in the first exposure condition, the setting unit sets a second exposure condition having shorter exposure time and a smaller aperture value than the first exposure condition, and the first calculation unit calculates a second amount of flash light emission smaller than the first amount of flash light emission.

8. The imaging apparatus according to claim 7, wherein the second amount of flash light emission is an amount of flash light emission to perform flash photography under the second exposure condition.

9. The imaging apparatus according to claim 7, wherein, when the first amount of flash light emission to perform flash photography under the first exposure condition is larger than the maximum amount, flash photography is performed using the second exposure condition and the second amount of flash light emission.

10. The imaging apparatus according to claim 7, further comprising:
    a second calculation unit configured to calculate a plurality of exposure conditions based on the result of light metering; and
    a selection unit configured to select one exposure condition from the calculated plurality of exposure conditions, wherein the setting unit sets the selected exposure condition as the second exposure condition.

11. The imaging apparatus according to claim 10, wherein the selection unit selects one exposure condition from the plurality of exposure conditions according to a scene to be captured or an imaging mode.

12. The imaging apparatus according to claim 10, wherein the selection unit selects an exposure condition having a smallest aperture value from the plurality of exposure conditions.

13. An imaging apparatus comprising:
a light metering unit;
a setting unit configured to set an exposure condition including exposure time and an imaging sensitivity at a time of flash photography based on a result of light metering by the light metering unit; and
a calculation unit configured to calculate an amount of flash light emission by a light emission unit to perform flash photography under the set exposure condition based on the result of light metering,
wherein, when a first amount of flash light emission to perform flash photography under a first exposure condition is larger than a maximum amount of flash light emission that can be achieved by the light emission unit, the setting unit sets a second exposure condition having shorter exposure time and a higher imaging sensitivity than the first exposure condition, and the first calculation unit calculates a second amount of flash light emission smaller than the maximum amount of flash light emission.

14. An imaging apparatus comprising:
a light metering unit;
a setting unit configured to set an exposure condition including exposure time and an imaging sensitivity at the time of flash photography based on a result of light metering by the light metering unit; and
a calculation unit configured to calculate an amount of flash light emission by a light emission unit to perform flash photography under the set exposure condition based on the result of light metering,
wherein, when light emission time corresponding to a first amount of flash light emission to perform flash photography under a first exposure condition is longer than the exposure time in the first exposure condition, the setting unit sets a second exposure condition having shorter exposure time and a higher imaging sensitivity than the first exposure condition, and the calculation unit calculates a second amount of flash light emission smaller than the first amount of light emission.

15. A method for controlling an imaging apparatus comprising:
performing light metering;
setting an exposure condition including exposure time and an aperture value at a time of flash photography based on a result of light metering; and
calculating an amount of flash light emission to perform flash photography under the set exposure condition based on the result of light metering,
wherein, when a first amount of flash light emission to perform flash photography under a first exposure condition is larger than a maximum amount of flash light emission that can be achieved by the light emission unit, a second exposure condition having shorter exposure time and a smaller aperture value than the first exposure condition is set, and a second amount of flash light emission smaller than the maximum amount of flash light emission is calculated.

16. A method for controlling an imaging apparatus comprising:
performing light metering;
setting an exposure condition including exposure time and an aperture value at a time of flash photography based on a result of light metering; and
calculating an amount of flash light emission by a light emission unit to perform flash photography under the set exposure condition based on the result of light metering,
wherein, when light emission time corresponding to a first amount of flash light emission to perform flash photography under a first exposure condition is longer than the exposure time in the first exposure condition, a second exposure condition having shorter exposure time and a smaller aperture value than the first exposure condition is set, and a second amount of flash light emission smaller than the first amount of flash light emission is calculated.

17. A method for controlling an imaging apparatus comprising:
performing light metering;
setting an exposure condition including exposure time and an imaging sensitivity at a time of flash photography based on a result of light metering; and
calculating an amount of flash light emission by a light emission unit to perform flash photography under the set exposure condition based on the result of light metering,
wherein, when a first amount of flash light emission to perform flash photography under a first exposure condition is larger than a maximum amount of flash light emission that can be achieved by the light emission unit, a second exposure condition having shorter exposure time and a higher imaging sensitivity than the first exposure condition is set, and a second amount of flash light emission smaller than the maximum amount of flash light emission is calculated.

18. A method for controlling an imaging apparatus comprising:
performing light metering;
setting an exposure condition including exposure time and an imaging sensitivity at the time of flash photography based on a result of light metering; and
calculating an amount of flash light emission by a light emission unit to perform flash photography under the set exposure condition based on the result of light metering,
wherein, when light emission time corresponding to a first amount of flash light emission to perform flash photography under a first exposure condition is longer than the exposure time in the first exposure condition, a second exposure condition having shorter exposure time and a higher imaging sensitivity than the first exposure condition is set, and a second amount of flash light emission smaller than the first amount of flash light emission is calculated.

19. An imaging apparatus comprising:
a light metering unit;
a setting unit configured to set an exposure condition including exposure time and an aperture value at a time of flash photography based on a result of light metering by the light metering unit; and
a first calculation unit configured to calculate an amount of flash light emission by a light emission unit to perform flash photography under the set exposure condition based on the result of light metering,
wherein the setting unit sets the exposure time at the time of flash photography, the exposure time being shorter than a light emission time corresponding to a maximum amount of flash light emission that can be achieved by the light emission unit and longer than or equal to a light emission time corresponding to the calculated amount of flash light emission.

20. A method for controlling an imaging apparatus comprising:
performing light metering;
setting an exposure condition including exposure time and an aperture value at a time of flash photography based on a result of light metering by the light metering unit;
calculating an amount of flash light emission by a light emission unit to perform flash photography under the set exposure condition based on the result of light metering; and
setting the exposure time at the time of flash photography, the exposure time being shorter than a light emission time corresponding to a maximum amount of flash light emission that can be achieved by the light emission unit and longer than or equal to a light emission time corresponding to the calculated amount of flash light emission.

* * * * *